United States Patent Office 2,934,519
Patented Apr. 26, 1960

2,934,519
ROOM TEMPERATURE CURING SILICONE RESINS

Harold A. Clark, Midland, Mich., assignor to Dow Corning Corporation, Midland, Mich., a corporation of Michigan No Drawing. Application June 27, 1958
Serial No. 744,921

4 Claims. (Cl. 260—46.5)

This invention relates to certain mixtures of organopolysiloxane resins with a monoorganotriacyloxysilane, which composition can be cured at room temperature.

The use of such monoorganotriacyloxysilanes for the curing of organopolysiloxane resins is shown in U.S. Patent 2,615,861. The silane employed in the method disclosed therein was methyltriacetoxysilane. While the resins disclosed there are cured by heating or exposure to air over long periods of time at room temperature, when coated on glass or metal surfaces it is desirable to find a system which will cure in air at room temperature within 24 hours. It is furthermore desirable that this new system cure on wood, which is generally harder to successfully coat than metal or glass.

The successful accomplishment of this goal must include the employment of an incompletely condensed resin. However, just any incompletely condensed resin, even those containing phenyl radicals, will not necessarily have the desired properties. For instance, some of these resins have been found to have poor shelf life and gel on standing.

The objects of this invention are primarily, first, to produce a resin system which will cure as a coating on wood within 24 hours at room temperature, second, to produce such a resin system which is stable on storage, and, third, to produce a commercially desirable varnish which can be easily employed by the average retail consumer.

This invention relates specifically to a resinous composition capable of curing at room temperature in air in 24 hours, which comprises the reaction product of certain organopolysiloxane resins with at least a sufficient amount of monoorganotriacyloxysilane to react one molecule of silane with each of the silicon-bonded hydroxyls in the organopolysiloxanes, thereby preventing gelation of the resins without completely inactivating them.

For the purpose of this invention, there must be at least two organopolysiloxane resins (A and B) in the system. Each of the resin components in both A and B must have a degree of substitution from 1.2 to 1.7 and must contain at least 0.25 to 1 phenyl radical per silicon atom. The phenyl radicals present in these amounts give heat stability to the resin but do not make the ultimate resins brittle. The remaining organic radicals on the silicon atoms in both A and B can be any alkyl radicals of less than 7 carbon atoms, e.g. methyl, ethyl, propyl, butyl, amyl, hexyl or their isomers.

Both components can be composed of one or more separate organopolysiloxanes. Each of the organopolysiloxanes in component A must have from 0.5 to 1.25% by weight silicon-bonded hydroxyl groups. Each of the organopolysiloxanes in component B must have from 1.5 to 5% by weight silicon-bonded hydroxyl groups. The ratio of A and B incorporated in the system must be such that a 50% by weight solution in xylene of the combination of A and B has a viscosity of from 50 to 150 cps. at 25° C.

The preparation of the organopolysiloxanes incorporated into the mixtures of this invention is now well known in the art. Upon hydrolysis of a mixture of chlorosilanes having from 1.2 to 1.7 of the desired organic radicals per silicon the resulting hydroxylated product condenses without further treatment until the hydroxyl content in the resin ranges generally from about 2.5 to 5% by weight. Subsequent heating of this "hydrolysate" will cause "bodying," i.e. further condensation of the resin. Partial bodying can reduce the silicon-bonded hydroxyl content of the resin to as low as 1.5% by weight. Further bodying produces organopolysiloxanes having as little as 0.5% by weight silicon-bonded hydroxyls. It is well known in the art that as the silicon-bonded hydroxyl content decreases, i.e. the organopolysiloxane condenses, the viscosity of the organopolysiloxane increases. In other words, there is a significant connection between the silicon-bonded hydroxyl content of an organopolysiloxane resin and its viscosity.

In the present invention, the use of a hydrolyzate or a partial bodied organopolysiloxane resin component (B) alone is unsatisfactory due to the fact that a large amount of acyloxysilane is necessary to react one molecule of silane per silicon-bonded hydroxyl group, and thereby prevents gelation of the resin in the container prior to use. However, when such a large amount of silane is added to prevent such gelation, the resin formulation is changed sufficiently to impair flex-craze resistance or ability to cure depending on the orignal formulation. When a bodied resin of component (A) is reacted with the acyloxysilane employed in this invention to remove the silicon-bonded hydroxyl groups, the resulting high-viscosity composition will skin-over or gel on standing in the container showing poor shelf life. However, it has been found that a blend of the two resin components mixed in such proportion as to produce a 50% by weight solution in xylene having a viscosity at 25° C. of from 50 to 150 cps. and reacted with an acyloxysilane within the limits of this invention neither gels nor skins in the container, but will air-dry as a coating in 24 hours at room temperature.

The monoorganotriacyloxysilane employed in this invention is added in an amount of 1 to 3 molecules of silane per silicon-bonded hydroxyl group in the resin blend. This insures the removal of all the silicon-bonded hydroxyl groups thereby giving good shelf life to the composition. The organic radicals on the silane-silicon can be any monovalent hydrocarbon radical of less than 4 carbon atoms, e.g. methyl, vinyl, ethyl, or propyl. The acyloxy radicals in the silane can have up to 3 carbon atoms, e.g. formoxy, acetoxy or propionoxy.

The preparation of these silanes is now well known in the art and is generally accomplished by reacting the proper monoorganotrichlorosilane with the proper carboxylic acid, its anhydride, or an alkali metal salt of the acid. The silanes can also be produced by the reaction of the silanol or silicon alkoxide with an acyl halide or anhydride as shown in U.S. Patent 2,634,285. The method of preparation of the silane is not critical.

When the silanes herein-described are mixed with blends of polysiloxane resins within the limitations set forth in this invention, the resulting mixture has excellent shelf life and yet will cure within 24 hours when applied as a coating to wood surfaces as well as metal surfaces, ceramic surfaces, and surfaces of such materials as cured resin laminates. However, if desired the cure can be accelerated by heating. Furthermore, the order of mixing is not critical since the acyloxysilane reacts with the organopolysiloxane silicon-bonded hydroxyl group as soon as they are present together.

The compositions of this invention can be applied to surfaces to be coated by any of the conventional means such as spraying, dipping or brushing. While the compositions of this invention can be used as such, it is generally preferred to employ them in solution in any solvent which will not react with the acyloxy group on the silane. Such solvents include benzene, toluene, xylene, perchloroethylene, chlorobenzene, dibutylether and methylisobutylketone. While the viscosity of a 50% by weight solution in xylene of the organopolysiloxane resin blend is a determinative factor in the operability of the blend, it is not intended that this be construed to mean that only xylene can be employed as a solvent. As long as it is known that a given combination of organopolysiloxanes has the characteristics described in this invention, it can be employed with the silane in an inert solvent. Any additives common to resin formulations can be added to the compositions of this invention, e.g. antioxidants, ultra-violet absorbents, pigments and the like.

The following examples are merely illustrative and are not intended to restrict this invention which is properly delineated in the claims. In these examples, copolymer I is a copolymer of 55 mol percent phenylmethylsiloxane units, 30 mol percent monomethylsiloxane units and 15 mol percent monophenylsiloxane units. Copolymer II is a copolymer of 31.4 mol percent phenylmethylsiloxane units, 34 mol percent monomethylsiloxane units and 34.6 mol percent monophenylsiloxane units. Copolymer III is a copolymer of 15 mol percent monomethylsiloxane units, 35 mol percent monophenylsiloxane units, 40 mol percent dimethylsiloxane units and 10 mol percent diphenylsiloxane units.

*Example 1*

Twenty-five g. of copolymer I bodied to a silicon-bonded hydroxyl content of 2.0% by weight and added as a 49% by weight solution in xylene and 25 g. of copolymer I bodied to a silicon-bonded hydroxyl content of 1.0% by weight and added as a 50% by weight solution in xylene were mixed together to form a blend having a viscosity between 50 and 150 cps. at 25° C. 9.7 g. of methyltriacetoxysilane equivalent to 1 molecule of silane per silicon-bonded hydroxyl group were added to the blend.

A wood panel was brush-coated with this composition, and the resulting coating cured to a clear solvent-insoluble film in 24 hours in air at room temperature. The unused resin composition has not skinned after 2 weeks of storage in a capped bottle.

*Example 2*

Twenty g. of copolymer I bodied to a silicon-bonded hydroxyl content of 2.0% by weight and added as a 49% by weight solution in xylene, 20 g. of copolymer I bodied to a silicon-bonded hydroxyl content of 1.0% by weight and added as a 50% by weight solution in xylene and 20 g. of copolymer II bodied to a silicon-bonded hydroxyl content of .75% weight and added as a 50% by weight solution in xylene were blended together. The viscosity of this solution at 25° C. was in the range of 50 to 150 cps. To this blend was added 11.8 g. of methyltriacetoxysilane equivalent to 1.2 molecules of silane per silicon-bonded hydroxyl group.

A polyester glass cloth lamiante was coated with this mixture. The coating cured in 3 hours in air at room temperature. The unused resin composition has not skinned after 2 weeks of storage.

*Example 3*

16.7 g. of copolymer II hydrolyzate having a silicon-bonded hydroxyl content of approximately 2.5% by weight and 33.3 g. of copolymer III bodied to a silicon-bonded hydroxyl content of from 1.0 to 1.2% by weight were blended together each as 50% by weight solutions in xylene. The viscosity of this solution at 25° C. was in the range of 50 to 150 cps. 11.5 g. of methyltriacetoxysilane were added to this blend. This is equivalent to from 1.1 to 1.2 molecules of silane per silicon-bonded hydroxyl group. A wood panel was brush-coated with this mixture and the resulting coating cured in air at room temperature in 24 hours. After 2 weeks of storage in a capped glass bottle, the mixture has neither skinned nor gelled.

*Example 4*

Fifty g. of copolymer I bodied to a silicon-bonded hydroxyl content of 1.0% by weight and 50 g. of copolymer II bodied to a silicon-bonded hydroxyl content of approximately 2.0% by weight were blended together, each as 50% by weight solutions in xylene. The resulting solution had a viscosity at 25° C. in the range of 50 to 120 cps. To this blend was added 20 g. of methyltriacetoxysilane equivalent to 1 molecule of silane per silicon-bonded hydroxyl group. Coatings of this mixture on wood cured in air at room temperature in 24 hours.

*Example 5*

When any of the following silanes are substituted for methyltriacetoxysilane in Example 1, the resulting mixtures will be completely stable on storage and will produce coatings on wood which will cure in air at room temperature in 24 hours.

$CH_3Si(OOCH)_3$
$C_2H_3Si(OOCCH_3)_3$
$C_2H_5Si(OOCH)_3$
$CH_3Si(OOCH)(OOCCH_2CH_3)_2$
$C_2H_3Si(OOCH)_3$

An equimolar mixture of $CH_3Si(OOCCH_3)$ and $CH_3CH_2CH_2Si(OOCH)_3$

*Example 6*

When the following organopolysiloxane mixture, of which a 50% by weight xylene solution has a viscosity of from 50 to 150 cps. at 25° C., is mixed with 9.1 grams of $CH_3Si(OOCH)_3$ equivalent to approximately 2.5 molecules of silane per silicon-bonded hydroxyl group, the resulting composition cures as a coating on wood, steel, aluminum, glass and polyester-glass cloth laminate surfaces in 24 hours or less in air at room temperature.

A mixture of (1) 9 grams of a copolymer of 42 mol percent phenylethylsiloxane units, 38 mol percent monohexylsiloxane units and 20 mol percent dibutylsiloxane units and having a silicon-bonded hydroxyl content of .8% by weight, (2) 6 grams of a copolymer of 30 mol percent phenylmethylsiloxane units and 70 mol percent monomethylsiloxane units and having a silicon-bonded hydroxyl content of 0.6% by weight, (3) 2 grams of a copolymer of 25 mol percent monomethylsiloxane units, 35 mol percent monophenylsiloxane units, 20 mol percent dimethylsiloxane units and 20 mol percent diphenylsiloxane units and having a silicon-bonded hydroxyl content of 4.8% by weight, and (4) 3 grams of a copolymer of 75 mol percent monophenylsiloxane units, 15 mol percent dimethylsiloxane units and 10 mol percent diphenylsiloxane units and having a silicon-bonded hydroxyl content of 3.5% by weight.

The composition is stable, i.e. will not gel or skin, when stored in a capped glass bottle for at least two weeks.

That which is claimed is:

1. A resinous composition capable of curing in a thin film at room temperature in air in 24 hours which comprises the reaction product of a mixture of two organopolysiloxane components in each of which each organopolysiloxane has attached to the silicon atoms by silicon-carbon bonds an average per silicon atom of from 1.2 to 1.7 monovalent hydrocarbon radicals of which from 0.25 to 1 radical per silicon atom is the phenyl radical and the remainder are alkyl radicals of less than seven carbon atoms, one organopolysiloxane component (A) being composed of organopolysiloxanes each of which has from 0.5 to 1.25 percent by weight silicon-bonded hydroxyls and the other organopolysiloxane component (B) being composed of organopolysiloxanes each of which has from 1.5 to 5 percent by weight silicon-bonded hydroxyl groups, components (A) and (B) being present in such proportions that a 50 percent by weight solution in xylene of the total organopolysiloxanes has a viscosity of from 50 to 150 cps. at 25° C., and from one to three molecules per silicon-bonded hydroxyl group contained in the total organopolysiloxanes A and B of an organosilane of the formula $RSi(OZ)_3$ in which each R is a monovalent hydrocarbon of less than four carbon atoms and each Z is an acyl radical of less than four carbon atoms.

2. The composition of claim 1 in which the organic radicals in the organopolysiloxanes are the phenyl and methyl radicals.

3. A method comprising (1) reacting in a closed system a mixture of two organopolysiloxane components in each of which each organopolysiloxane has attached to the silicon atoms by silicon-carbon bonds an average per silicon atom of from 1.2 to 1.7 monovalent hydrocarbon radicals of which from 0.25 to 1 radical per silicon atom is the phenyl radical and the remainder are alkyl radicals of less than seven carbon atoms, one organopolysiloxane componet (A) being composed of organopolysiloxanes each of which has from 0.5 to 1.25 percent by weight silicon-bonded hydroxyls and the other organopolysiloxane component (B) being composed of organopolysiloxanes each of which has from 1.5 to 5 percent by weight silicon-bonded hydroxyl groups, components (A) and (B) being present in such proportions that a 50 percent by weight solution in xylene of the total organopolysiloxanes has a viscosity of from 50 to 150 cps. at 25° C., and from one to three molecules per silicon-bonded hydroxyl group contained in the total organopolysiloxanes A and B of an organosilane of the formula $RSi(OZ)_3$ in which each R is a monovalent hydrocarbon of less than four carbon atoms and each Z is an acyl radical of less than four carbon atoms, (2) storing the reaction product in the closed system and (3) exposing the reaction product to air and whereby it cures to a resinous product.

4. The method of claim 3 wherein the reaction product is exposed to air as a thin coating on a base member.

No references cited.

UNITED STATES PATENT OFFICE

CERTIFICATE OF CORRECTION

Patent No. 2,934,519                            April 26, 1960

Harold A. Clark

It is hereby certified that error appears in the printed specification of the above numbered patent requiring correction and that the said Letters Patent should read as corrected below.

Column 3, line 13, for "in an" read -- in any --.

Signed and sealed this 20th day of September 1960.

(SEAL)
Attest:
KARL H. AXLINE                                      ROBERT C. WATSON
Attesting Officer                                    Commissioner of Patents